Feb. 22, 1955     R. O. HELGEBY     2,702,520
COMBINED TACHOMETER SPEEDOMETER
Filed July 11, 1952
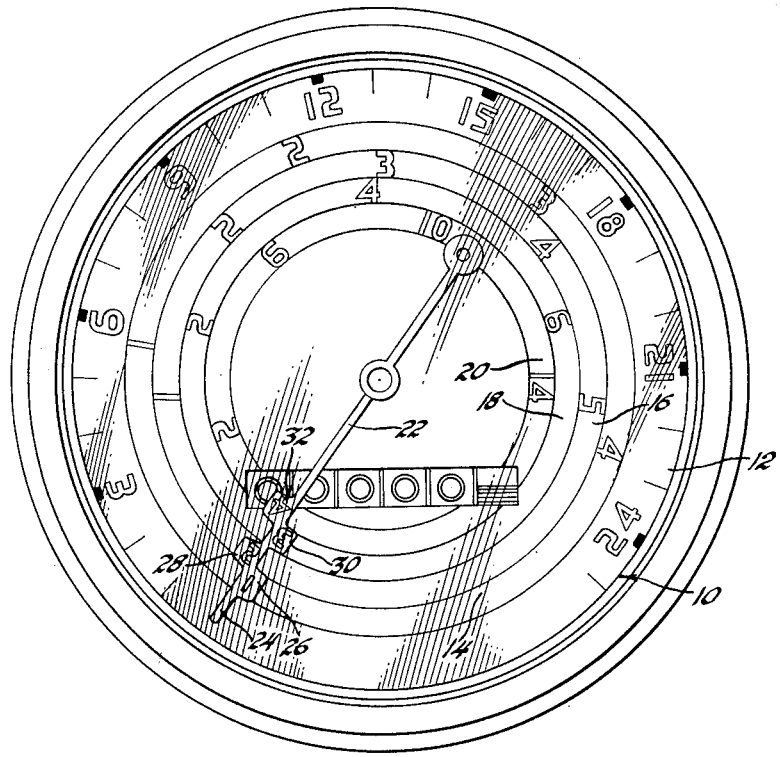
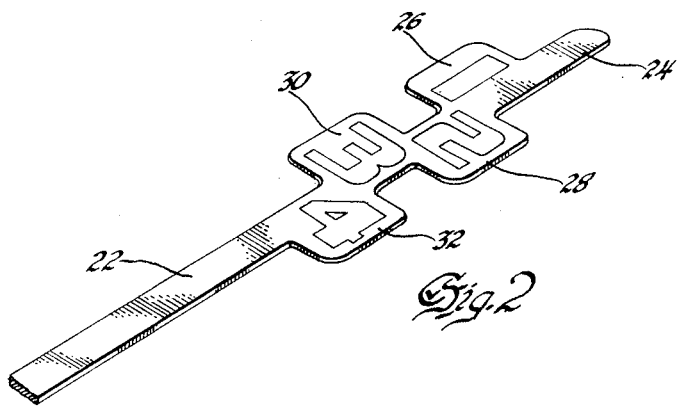
Inventor
Ralph O. Helgeby
By Willits, Helwig & Baillo
Attorneys

United States Patent Office 2,702,520
Patented Feb. 22, 1955

2,702,520

COMBINED TACHOMETER SPEEDOMETER

Ralph O. Helgeby, Flint, Mich., assignor to General Motors Corporation, Detroit, Mich., a corporation of Delaware Application July 11, 1952, Serial No. 298,395

1 Claim. (Cl. 116—129)

This invention relates to indicating instruments and, more particularly, to a combined tachometer speedometer.

In commercial vehicle installations such as tractors, road machinery, trucks, and buses it is common practice to use an engine driven tachometer which indicates the revolutions per minute of the engine. A wheel or drive shaft driven speedometer is not normally installed on vehicles of this type. However, the operators of these vehicles are very often interested in knowing the speed of the vehicle. Since these vehicles have manual transmissions, the operator will know the gear ratio in which the transmission is operating. Thus by providing an engine driven tachometer dial, which normally only has a scale for the revolutions per minute of the engine, with additional scales showing the speed in miles per hour for each gear ratio of the transmission, the operator, knowing the gear ratio in which the transmission is operating, can readily read the vehicle speed in miles per hour indicated by the pointer. In order to make the dial readily readable, the pointer carries flags indicating each speed ratio of the transmission which overlay the scale indicia on the dial indicating vehicle speed in each speed ratio.

The primary object of the invention is to provide in an engine driven tachometer an additional dial scale for the equivalent speed of the vehicle in a transmission speed ratio and scale indicating means on the tachometer pointer.

Another object of the invention is to provide in an engine driven tachometer a plurality of scales for the equivalent speed of the vehicle in various gear ratios of the transmission on the dial and scale indicia on the tachometer pointer to indicate the gear ratio of each of the scales for indicating the vehicle speed.

Another object of the invention is to provide in an instrument having a plurality of series of scales on the dial a pointer having an indicia member overlaying the dials and indicating the function of the scales.

These and other objects of the invention will be more apparent from the following description and drawing of a preferred embodiment of the invention.

Fig. 1 shows an elevational view of the instrument dial with the pointer mounted thereon.

Fig. 2 shows an enlarged perspective view of a portion of the pointer showing the flags indicating the function of the indicia on the scales.

The instrument dial having a plurality of scales and the pointer having indicia overlaying and indicating the function of the scales is illustrated in conjunction with an engine driven tachometer dial and pointer. Tachometers of this type are often used on commercial vehicles such as tractors, road machinery, trucks, and buses. Though it is important to the operator of these vehicles to have an engine speed indicator, it is also very desirable for the operator to have an instantaneous speed indication and preferably on the same instrument. Since these vehicles have manually shiftable transmissions, the operator will know what gear he is operating in at any time. Also for each vehicle having the same transmission and rear end ratios the vehicle speed in miles per hour can be readily determined from the number of engine revolutions. In this way corresponding scales for engine revolutions and vehicle speed in each of the gear ratios can be calculated.

The combined tachometer and speedometer dial 10 has a scale 12 for the engine speed in revolutions per minute arranged annularly about the perimeter of the dial. A plurality of scales for the vehicle speed in miles per hour in each gear ratio for the corresponding engine revolutions on scale 12 are arranged concentrically within scale 12. The scale 14 showing vehicle speed in first gear ratio is located concentrically within scale 12. The scale 16 showing the vehicle speed in second speed or gear ratio is located concentrically within scale 14. The scale 18 showing the vehicle speed in third gear ratio is located concentrically within scale 16. The scale 20 showing the vehicle speed in fourth gear ratio is located concentrically within scale 18.

The pointer 22 is pivotally mounted at the center of the dial 10 and driven by a suitable tachometer drive mechanism. A suitable drive mechanism is shown in United States Patent 2,073,153. The pointer 22 has a tip 24 overlaying and indicating the revolutions per minute on scale 12. The pointer has a rectangular flag 26 having suitable indicia such as a numeral 1. The flag extends laterally from the pointer and overlays the first gear ratio scale. A second flag 28 having indicia such as numeral 2 extends laterally from the pointer in a direction opposite from flag 26. The second flag 26 overlays the second gear ratio scale 16. Similar third rectangular flag 30 and fourth rectangular flag 32 extend from the pointer and overlay respectively the third gear ratio scale 18 and the fourth gear ratio scale. These third and fourth flags also may have suitable indicia such as the numerals 3 and 4, respectively. The flags are arranged so that the first and third flag extend from one side of the pointer while the second and fourth flags extend from the other side of the pointer to make the instrument easy to read.

This instrument dial and pointer is easily read to determine the engine revolutions as indicated by the pointer 24 over the outer dial 12. The instruments also clearly indicate the vehicle speed at any one of the speed ratios. The operator controls the manual transmission and thus knows the gear ratio in which the vehicle is operating. Thus, he can look at the pointer to locate the proper flag corresponding to this speed ratio and directly read the speed of the vehicle on the dial in alignment with this flag.

The invention which is illustrated by the above described preferred embodiment is subject to modification by those skilled in the art within the scope of the appended claims.

I claim:

In an indicating tachometer and speedometer for a vehicle, a dial provided with concentric scales of different radii, the scale of greatest radius being calibrated to indicate engine revolutions per minute, the other scales being calibrated to indicate vehicle speeds in each of multiple transmission gear ratios, a pointer overlying said scales and pivoted concentrically therewith, said pointer being adapted to be positioned dependent upon the engine speed with one end thereof contiguous to the said scale of greatest radius, and a numerical symbol on said pointer contiguous to each of the other scales to indicate the gear ratio corresponding thereto.

References Cited in the file of this patent

UNITED STATES PATENTS

| | | |
|---|---|---|
| 1,413,214 | Bassett | Apr. 18, 1922 |
| 1,417,048 | Farmer | May 23, 1922 |
| 1,635,479 | Hutchinson | July 12, 1927 |
| 2,175,129 | Rolfson | Oct. 3, 1939 |

FOREIGN PATENTS

| | | |
|---|---|---|
| 201,405 | Great Britain | Aug. 2, 1923 |